United States Patent [19]
Heideman et al.

[11] Patent Number: 5,940,826
[45] Date of Patent: Aug. 17, 1999

[54] DUAL XPCS FOR DISASTER RECOVERY IN MULTI-HOST COMPUTER COMPLEXES

[75] Inventors: Michael J. Heideman; Thomas P. Cooper, both of New Brighton, Minn.

[73] Assignee: Unisys Corporation, Blue Bell, Pa.

[21] Appl. No.: 08/779,689

[22] Filed: Jan. 7, 1997

[51] Int. Cl.[6] .................................................. G06F 17/30
[52] U.S. Cl. ...................... 707/8; 395/182.13; 711/164
[58] Field of Search ........................ 711/164; 364/246.8, 364/267, 269.1; 707/8; 395/182.13

[56] References Cited

U.S. PATENT DOCUMENTS

| | | | |
|---|---|---|---|
| 3,685,020 | 8/1972 | Meade | 340/172.5 |
| 3,806,888 | 4/1974 | Brickman et al. | 340/172.5 |
| 4,020,466 | 4/1977 | Cordi et al. | 340/172.5 |
| 4,084,231 | 4/1978 | Capozzi et al. | 364/200 |
| 4,088,254 | 5/1978 | Hooper | 224/45 R |
| 4,136,386 | 1/1979 | Annunziata et al. | 364/200 |
| 4,298,929 | 11/1981 | Capozzi | 364/200 |
| 4,314,331 | 2/1982 | Porter et al. | 364/200 |
| 4,394,733 | 7/1983 | Swenson | 364/200 |
| 4,603,380 | 7/1986 | Easton et al. | 364/200 |
| 4,646,229 | 2/1987 | Boyle | 364/200 |
| 4,853,843 | 8/1989 | Ecklund | 364/200 |
| 4,897,781 | 1/1990 | Chang et al. | 364/200 |
| 4,967,353 | 10/1990 | Brenner et al. | 364/200 |
| 5,032,979 | 7/1991 | Hecht et al. | 364/200 |
| 5,043,885 | 8/1991 | Robinson | 364/200 |
| 5,089,958 | 2/1992 | Horton et al. | 395/575 |
| 5,093,787 | 3/1992 | Simmons | 364/406 |
| 5,140,685 | 8/1992 | Sipple et al. | 395/425 |
| 5,146,573 | 9/1992 | Sato et al. | 395/425 |
| 5,163,131 | 11/1992 | Row et al. | 395/200 |
| 5,193,162 | 3/1993 | Bordsen et al. | 395/425 |
| 5,202,969 | 4/1993 | Sato et al. | 395/425 |
| 5,222,224 | 6/1993 | Flynn et al. | 395/425 |
| 5,263,145 | 11/1993 | Brady et al. | 395/425 |
| 5,305,389 | 4/1994 | Palmer | 382/1 |
| 5,307,484 | 4/1994 | Baker et al. | 395/600 |

(List continued on next page.)

OTHER PUBLICATIONS

Kohler, "A Survey of Techniques for Synchronization and Recovery in Decentralized Computer Systems", *Computing Surveys*, vol. 13, No. 2, Jun. 1981, pp. 149–183.

E.I. Cohen et al.,1 "Storage Hierarchies", *Systems Journal*, vol. 28, No. 1, 1969, pp. 62–76.

Nelson et al., "Caching in the Sprite Network File System", *ACM Transactions on Computer Systems*, vol. 6, No. 1, Feb. 1988, pp. 134–154.

Howard et al., "Scale and Performance in a Distributed File System", *ACM Transactions on Computer Systems*, vol. 6, No. 1, Feb. 1988, pp. 51–81.

Kaunitz et al., "Audit Trail Compaction for Database Recovery", *Communications of the ACM*, vol. 27, No. 7, Jul. 1984, pp. 678–683.

Gray, "The Recovery Manager of the System R Database Manager", *Computing Surveys*, vol. 13, No. 2, Jun. 1981, pp. 223–242.

Verhofstad, "Recovery Techniques for Database Systems", *Computing Surveys*, col. 10, No. 2, Jun. 1978, pp. 167–194.

*Primary Examiner*—Paul V. Kulik
*Assistant Examiner*—Jean M. Corrielies
*Attorney, Agent, or Firm*—Charles A. Johnson; Mark T. Starr; Nawrocki, Rooney & Sivertson, PA

[57] ABSTRACT

A computer system having dual outboard devices for generating audit trail sequence numbers and performing file locking. One embodiment includes a master and a slave outboard device, where lock request handling includes a lock request first sent to the master, lock grant awaited, followed by a request sent to the slave. Unlock request handling includes sending an unlock request to slave first, followed by sending an unlock request to the master. Obtaining a system sequence number includes always reading the slave outboard device, then reading the master outboard device. The computer system includes a method for switching host processors from a single outboard device mode to a dual outboard device mode and back again in the event of failure of one of the outboard devices.

11 Claims, 12 Drawing Sheets

U.S. PATENT DOCUMENTS

| | | | |
|---|---|---|---|
| 5,309,451 | 5/1994 | Noya et al. | 371/40.4 |
| 5,325,509 | 6/1994 | Lautzenheiser | 395/425 |
| 5,353,425 | 10/1994 | Malamy et al. | 395/425 |
| 5,371,855 | 12/1994 | Idleman et al. | 395/250 |
| 5,390,318 | 2/1995 | Ramakrishnan et al. | 395/425 |
| 5,404,508 | 4/1995 | Konrad et al. | 395/600 |
| 5,418,921 | 5/1995 | Cortney et al. | 395/425 |
| 5,488,731 | 1/1996 | Mendelsohn | 395/800 |
| 5,499,354 | 3/1996 | Aschoff et al. | 395/456 |
| 5,515,507 | 5/1996 | Byers et al. | 395/185.09 |
| 5,519,876 | 5/1996 | Byers et al. | 395/800 |
| 5,526,511 | 6/1996 | Swenson et al. | 395/461 |
| 5,530,799 | 6/1996 | Marsh et al. | 395/164 |
| 5,535,405 | 7/1996 | Byers et al. | 395/800 |
| 5,544,343 | 8/1996 | Swenson et al. | 395/460 |
| 5,561,795 | 10/1996 | Sarkar | 395/600 |
| 5,612,965 | 3/1997 | Michaelson | 371/49.1 |
| 5,649,092 | 7/1997 | Price et al. | 395/182.13 |
| 5,701,473 | 12/1997 | Braseth et al. | 707/205 |
| 5,758,149 | 5/1998 | Bierma et al. | 707/5 |

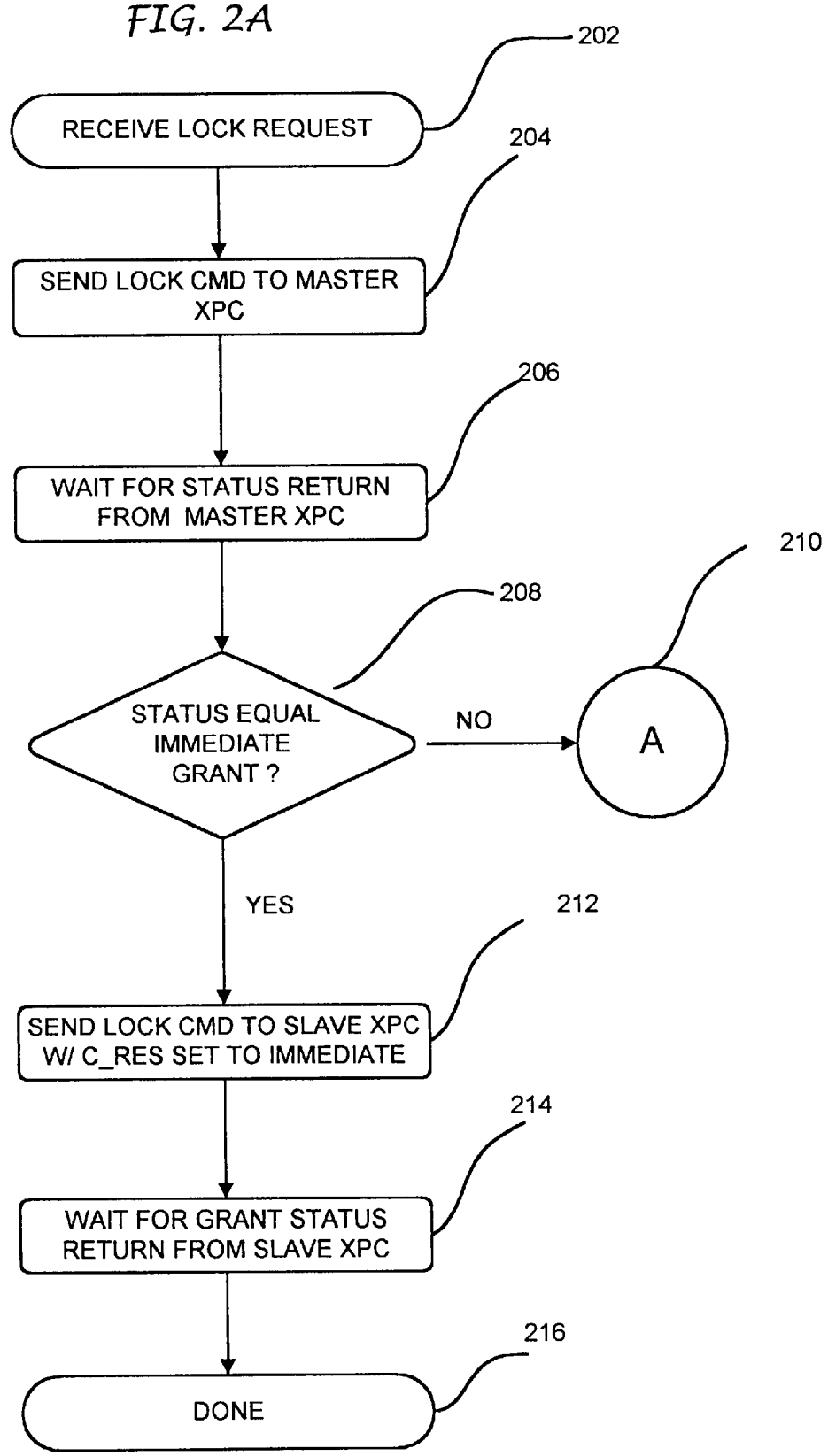

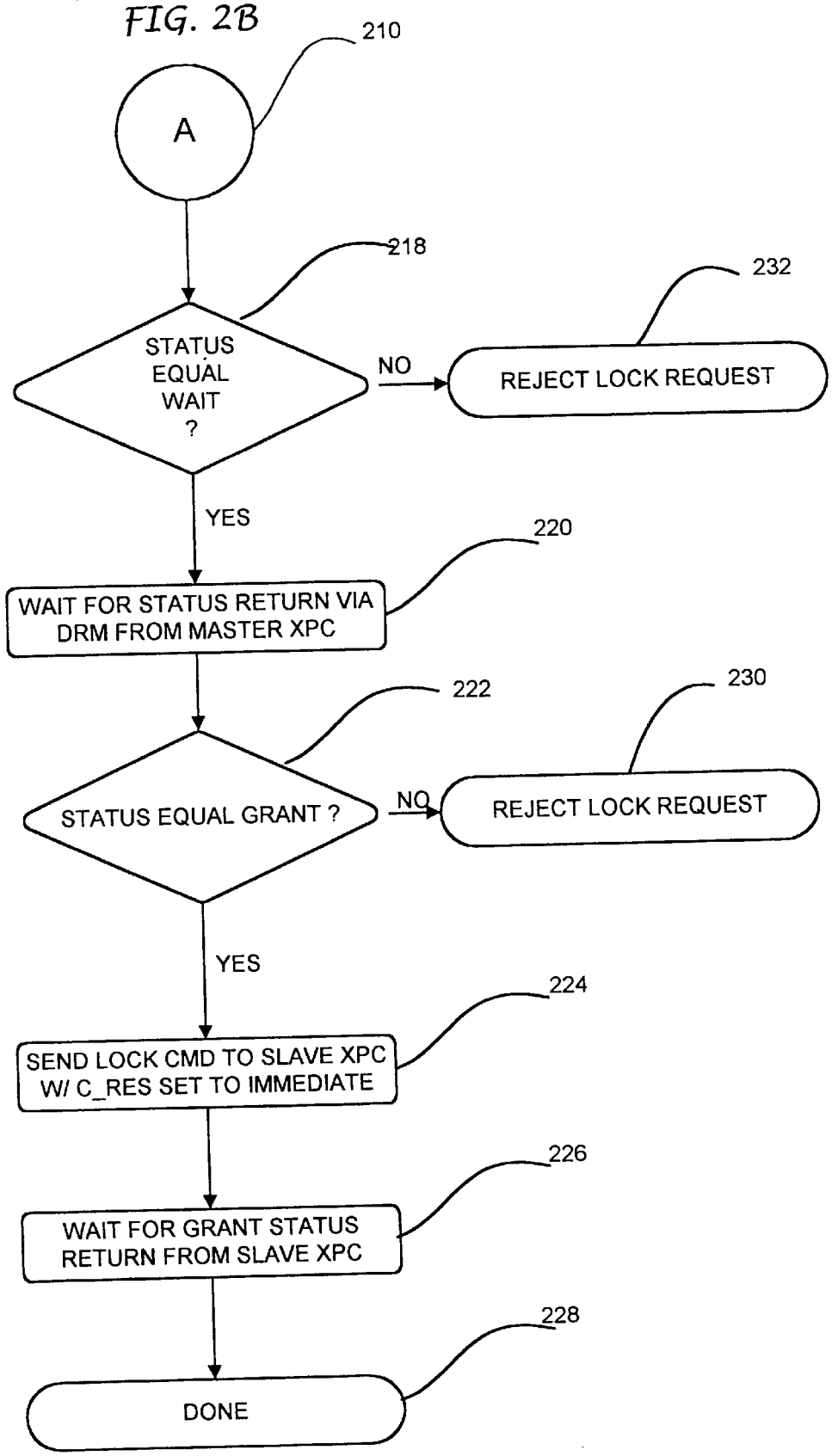

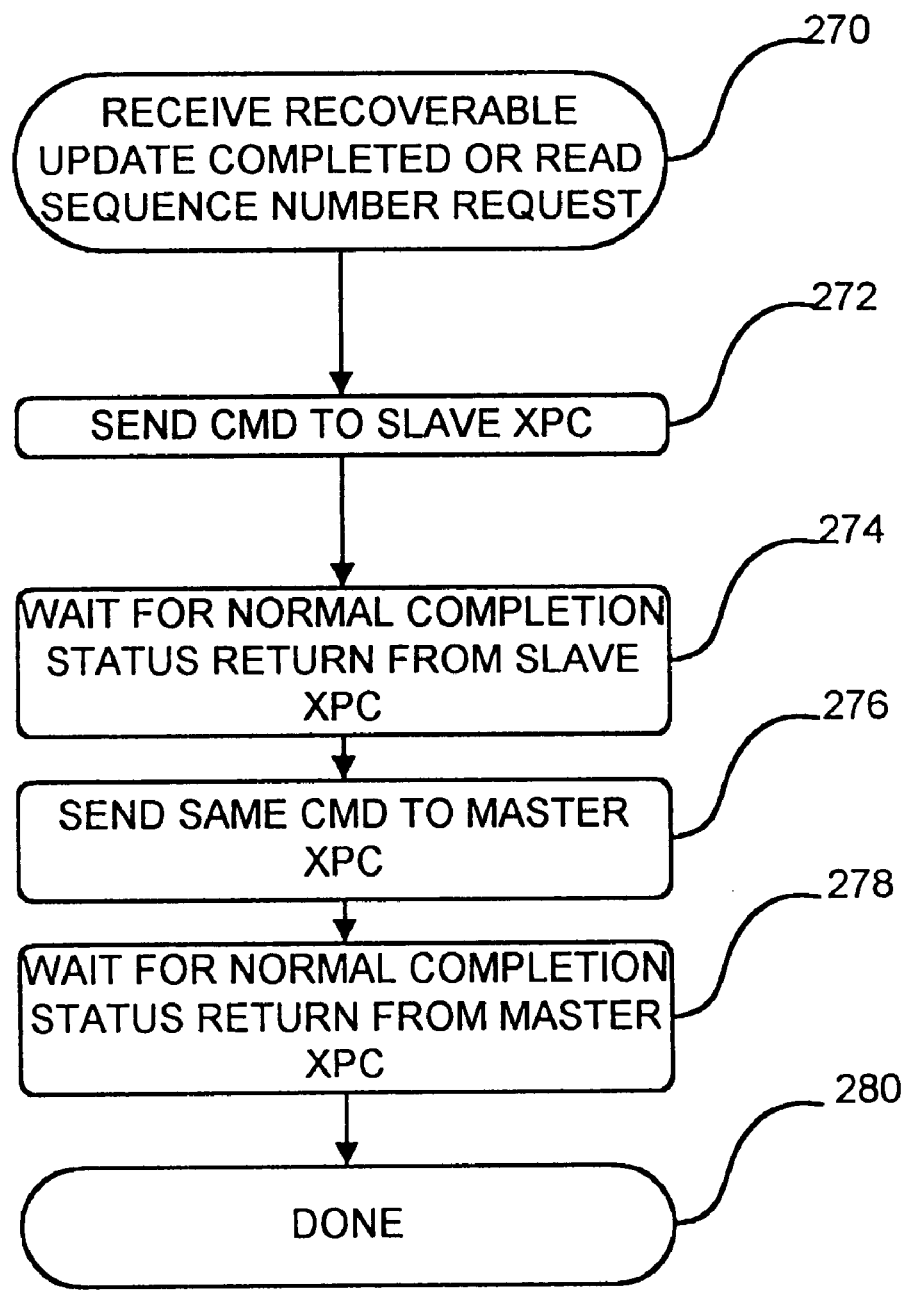

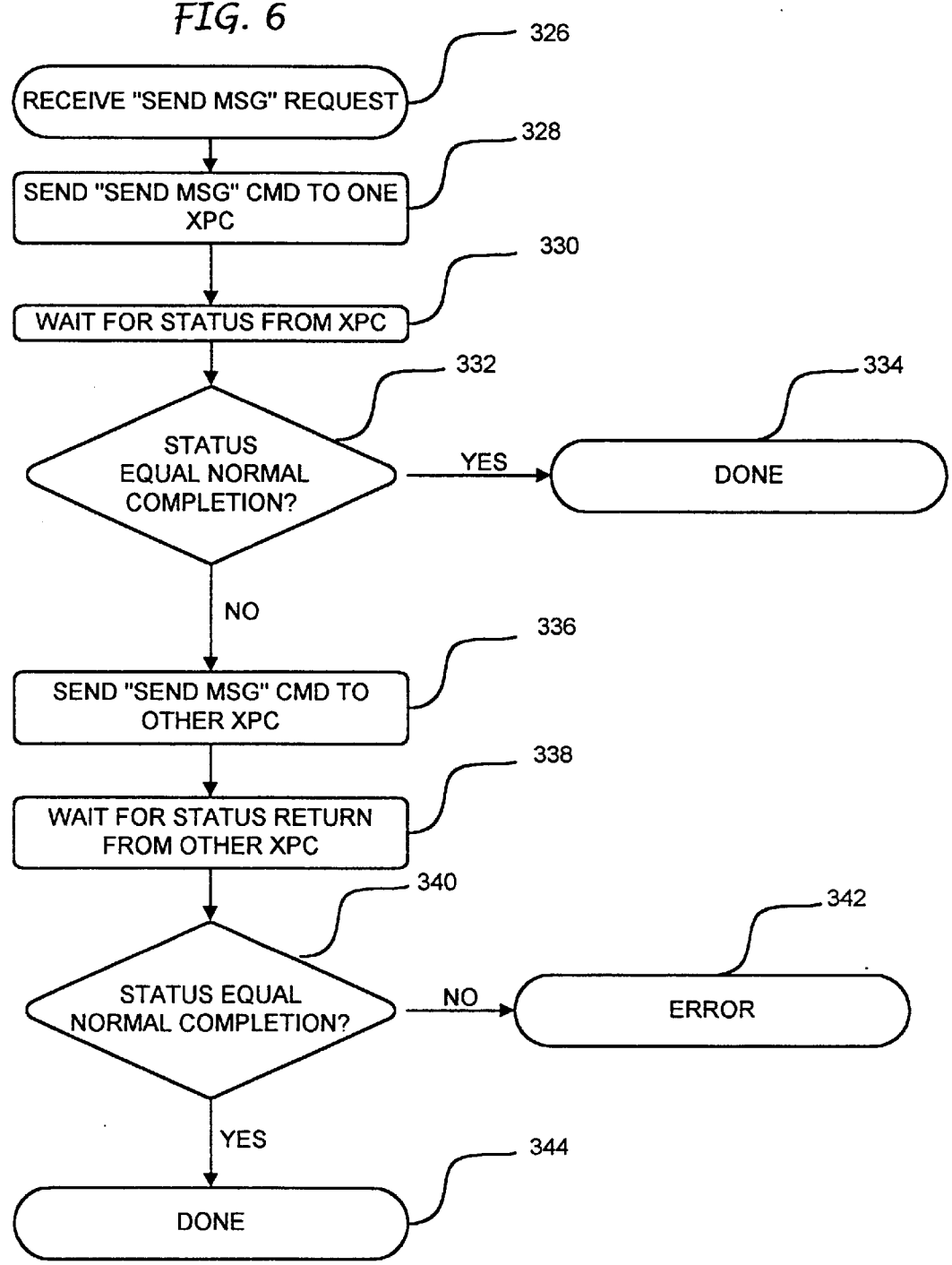

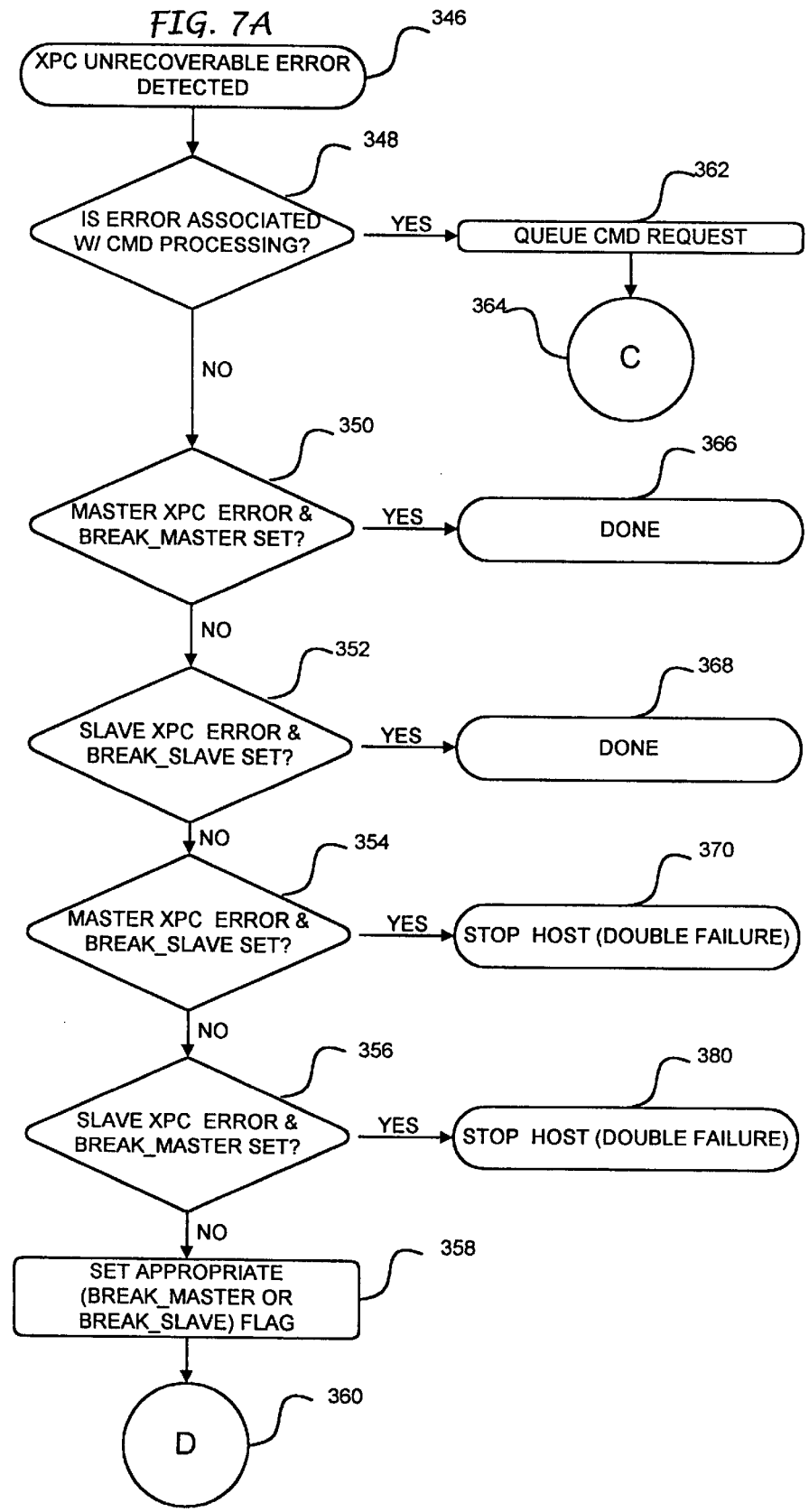

DUAL XPCS FOR DISASTER RECOVERY IN MULTI-HOST COMPUTER COMPLEXES

CROSS REFERENCES TO CO-PENDING APPLICATIONS

The present application is related to U.S. patent application Ser. No. 08/779,681, filed Jan. 7, 1997, entitled "Dual XPCS for Disaster Recovery", which is assigned to the assignee of the present invention and is hereby incorporated by reference.

BACKGROUND OF THE INVENTION

1. Field of the Invention

The present invention relates generally to high reliability computer complexes. More specifically, the invention relates to a device and method for providing a computer system with dual file locking and audit trail sequence number generating capabilities.

2. Description of the Prior Art

High reliability computers and computer systems are used in demanding applications including on-line airline reservation and ticketing systems, credit card systems, and banking and automatic teller machine systems. Such applications require high throughput transaction processing and short response times. The applications require high reliability as users are unable to transact business while the computer system is down. The nature of the transactions require access from geographically diverse sites to a central shared database, as the transactions act upon the same shared database and cannot be completely distributed.

The financial nature of the applications requires high reliability in that transactions cannot be lost, performed twice, or performed only in part. This requires rigorously designed hardware and software including database locking and audit trail capabilities. The requirements of operating upon a central database, high reliability, high availability, a fast response combine to require solutions not possible by simply adding more host processors ad hoc.

The use of computer clusters as a means for adding more host processors is becoming more common, particularly the use of multiple host computers in place of an equivalently sized single larger host computer. The use of multiple hosts provides incremental scalability in both performance and reliability. Specifically, additional capacity in throughput and storage capacity can be obtained by adding an additional host, rather than removing one host and replacing the host with an even larger host. The loss of one of several hosts for planned or unplanned reasons is more tolerable in a system with several hosts than a single host. Access to files in a computer system requires coordinated access among multiple processes. Such coordination within a single computer is accomplished using well known methods such as file locking of varying granularities. Communication among several processes is ultimately directed by the operating system or database manager.

The use of sequence numbers in database management is well known. The relative order of actions upon a database are important at two levels. At a finer level, the relative ordering is important to allow a rollback of the individual actions upon a database. An example of such a rollback is the undoing of updates to a data base when a transaction dies at a point that would leave the database in an inconsistent state. Such a rollback would be required when a disk drive died midway through a funds transfer. (e.g., during a transfer of funds one account has been debited but the other account has not yet been credited.) The debit can be undone and the transaction tried again, perhaps on a mirrored copy of the failed disk. Timestamps are often used for this purpose, even though the relative ordering is more important than the wall clock time.

At a coarser level, sequence numbers are used as an audit trail to return a database to a recent state given an initial consistent state and a series of consistent transactions. An example of this would be bringing the disks of a downed host up to date, given an initial state and a list of account transfers that have occurred since the disks were taken down. This coarser use of sequence numbers is referred to in the present application as the use of "Commit Sequence Numbers" (CSNs).

In a multi-host environment, both file locking and sequence number generation become more difficult. If the hosts are peers on a network, there is no equivalent of an operating system overseeing all file access as there is among processes within a single computer. While a multiplicity of hosts increases system power and scalability, it complicates contention problems for shared files as host run asynchronous of one another and can have different opinions as to whether a file is locked at the same instant in time.

This complication can be countered by using a central "outboard" device to control access to shared files, using file locking which resides in the central device. The term "outboard" refers to the fact that the device is located outside of the host input-output boundary. The design and use of an outboard file cache system is described in commonly assigned U.S. patent application Ser. No. 08/174,750, filed Dec. 23, 1993, now U.S. Pat. No. 5,809,527, entitled "Outboard File Cache System", which is herein incorporated by reference (hereafter referred to as the "OFC" application). The device as disclosed in the OFC application is used to cache files. The outboard device is a fully functional computing device and is used in the present invention to generate sequence numbers and perform inter-host messaging as well.

U.S. Pat. No. 5,140,685 describes a precursor outboard device to the XPC which included file locking, sequence number generation, and messaging. U.S. patent application Ser. No. 08/174,750, now U.S. Pat. No. 5,809,527 describes an outboard file cache device. U.S. patent application Ser. No. 08/779,681, filed Jan. 7, 1997, titled "Dual XPCS for Disaster Recovery" (RA-3431) describes the use of dual outboard file cache devices. All of the above, commonly assigned patents and applications are herein incorporated by reference.

Sequence number generation from multiple hosts operating on the same shared files becomes a problem as different hosts have slightly different internal times and have different internal counters. Synchronizing either times or counters between hosts executing millions of instructions per second is problematic. Even where it can be done, the forced lock-step execution penalty is severe. A solution is to use a central outboard device to issue sequence numbers upon request to any of the several hosts in a system. The central device can be an outboard device, residing away from the main bus of any of the hosts.

In using a central outboard device for either file locking or sequence number generation, the central device is potentially a single point of failure. Physically adding a second outboard device in communication with each of the hosts is possible, but creates several problems that have not heretofore been solved.

One problem includes coordinating or dealing with the sequence numbers generated by asynchronously running outboard devices. Another problem includes reliably handling outboard devices dying and coming on line. Yet another problem relates to file locking in a system having a single outboard device, file locking in a system initially having two un-synchronized outboard devices, file locking in a system having two un-synchronized outboard devices, and transitions between these systems without losing locks. In particular, a high availability system can have some hosts aware of two outboard devices and other hosts unaware.

SUMMARY OF THE INVENTION

The present invention includes a data processing system having dual outboard devices operating in a "Distributed System Manager" (DSM) mode, including file locking and interhost messaging, but not including file caching. For this reason, the outboard file cache devices incorporated by reference above, having caching disabled, are referred to herein as "outboard devices". This mode of operating outboard file caches is used to coordinate multiple hosts sharing files and requiring a central commit sequence number. "Dual Mode" or "Dual XPC Mode" is used in place of the longer and more accurate "Dual DSM XPC Mode" in the present application. The preferred embodiment of outboard device is an "Extended Processing Complex" (XPC), disclosed in the patent application incorporated by reference above. As the XPC is the preferred embodiment, the terms XPC is used interchangeably with "outboard device".

A highly available, highly reliable system is provided generally by clustering together multiple hosts and multiple disks, and in some embodiments, multiple sites, each site containing a cluster. Central sequence number generation is provided by an XPC, which grants sequence numbers upon request, to any requesting host, incrementing an internal sequence number in the process. In the preferred embodiment, sequence numbers are "commit sequence numbers", sequence numbers used to order a series of complete, consistent transactions acting on the files and/or data base. In another embodiment, the sequence numbers are used to recover from errors and put the data base into a consistent state. Centralized file locking is provided by the XPC, with the XPC locking data, unlocking data, performing deadlock detection through timers and cyclic lock analysis, and performing deadlock breaking. Both file locking and sequence number generation is used by applications managing data and database applications.

The centralized sequence number generation and file locking provided by the XPC provides a possible single point of failure, remedied by the present invention's use of dual XPCs together with methods included in the present invention. A first XPC is referred to as the "Master XPC", and a second XPC is referred to as the "Slave XPC".

The present invention includes a method for utilizing dual Commit Sequence Number (CSN) generators, including querying and incrementing both XPCs, and returning only the CSN from the master. The preferred embodiment queries the slave first, then the master, as a method for ensuring the slave XPC contains a CSN greater than or equal to the CSN in the master XPC. This enables a series of commits, or transactions, to be ordered, even when one of the XPCs dies. If the slave XPC dies, the CSN ordering is not affected as the slave XPC was not in use, as only the master XPC CSN is recorded in the preferred embodiment. If the master XPC dies, the first CSN obtained after the master XPC dies will be the CSN from the slave XPC, which is guaranteed to be no less than the master XPC CSN. The slave XPC CSN is not guaranteed to be equal to the master XPC CSN, therefore there may be a slight gap in CSN. As the CSNs are used for relative ordering, this possible gap is of no consequence, and ordering a series of commits before and after an XPC failure is provided by the present invention.

The present invention does not require the two XPCs to operate synchronously, and different hosts can obtain CSNs asynchronously, in different order, from the two XPCs. This freedom to run asynchronously allows for increased speed and throughput, not requiring synchronization points between XPCs during normal operation.

Establishing a slave XPC with a CSN no less than the master XPC is done by labelling the first XPC running with the first host running, the master XPC. As multiple hosts are added, the master XPC is master to the new hosts as well. When a second XPC is added, it will be the slave XPC to a host when the host establishes dual XPC mode, recognizing the slave XPC. Other hosts will recognize the slave XPC in the same manner. When a host is adding the slave XPC, the slave XPC is periodically resynchronized to have a value no less than the value of the master XPC, by use of a background task, running until all hosts are running in dual XPC mode. The task periodically reads the master XPC CSN, and sends it to the slave XPC, with a request for re-synchronization. The slave XPC, being queried for CSNs ahead of the master XPC, adds the total number of CSN requests received since the last resynchronization request to the master CSN, and sets the internal CSN no less than this value. The periodic background is no longer required once all hosts are in dual XPC mode.

Coordination of file locking is accomplished by requesting locks first from the master XPC, then the slave XPC, and unlocking files first in the slave XPC then in the master XPC. File lock requests may be queued in the master, but not in the slave. Loss of either XPC may result in loss of a queued lock request, but not of a lock, using the present invention.

The present invention thus provides central sequence number generation and file locking while providing for continued operation after failure of the centralized device.

BRIEF DESCRIPTION OF THE DRAWINGS

FIGS. 2A and 2B are flow charts illustrating operating system handling of a file lock request;

FIG. 5 is a flow, chart illustrating operating system handling of a recoverable update completed or read sequence number request;

FIG. 6 is a flow chart illustrating operating system handling of a send message request;

FIGS. 7A and 7B are flow charts illustrating operating system handling of an unrecoverable outboard device (XPC) error and termination of dual XPC mode;

FIGS. 8A and 8B are flow charts illustrating operating system handling of an initiate dual outboard device (dual XPC) mode request.

DETAILED DESCRIPTION OF THE PREFERRED EMBODIMENTS

Figure 1A:
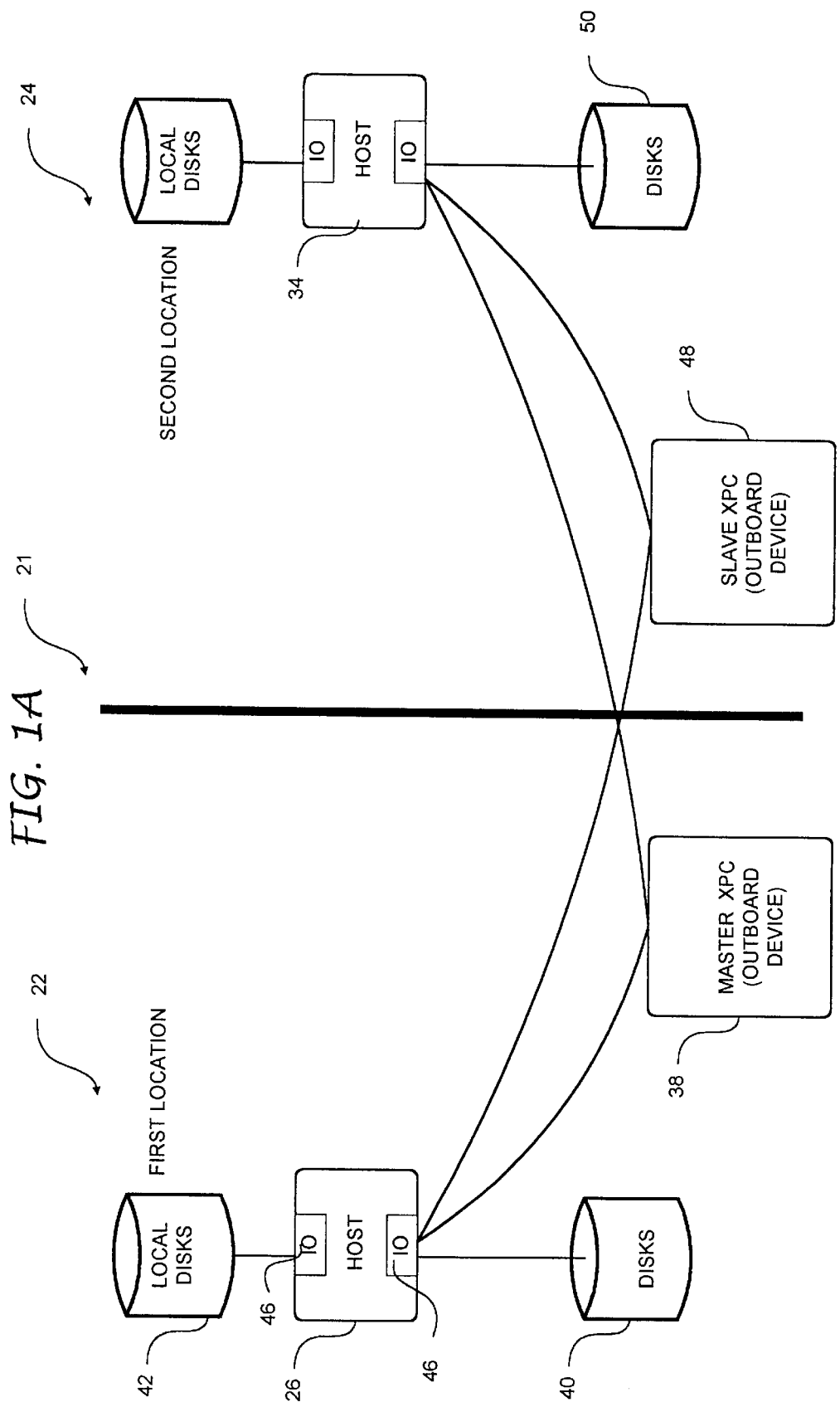
FIG. 1A is a block diagram of a data processing system including two locations and dual outboard devices (XPCs)

FIG. 1A illustrates, in a highly diagrammatic fashion, a data processing system 21 located at two sites, a first site 22 and a second site 24. First site 22 includes host 26 and second site 24 includes host 34. Host 26 communicates with local, not-shared disks 42 and disks 40 through Input-Output Complexes (IOCs) 46. Extended Processing Complex (XPC) 38 is illustrated communicating with host 26 through IOC 46. FIG. 1A illustrates a cluster including host, disks, and XPC at first site 22, and a second cluster at second site 24.

Figure 1B:
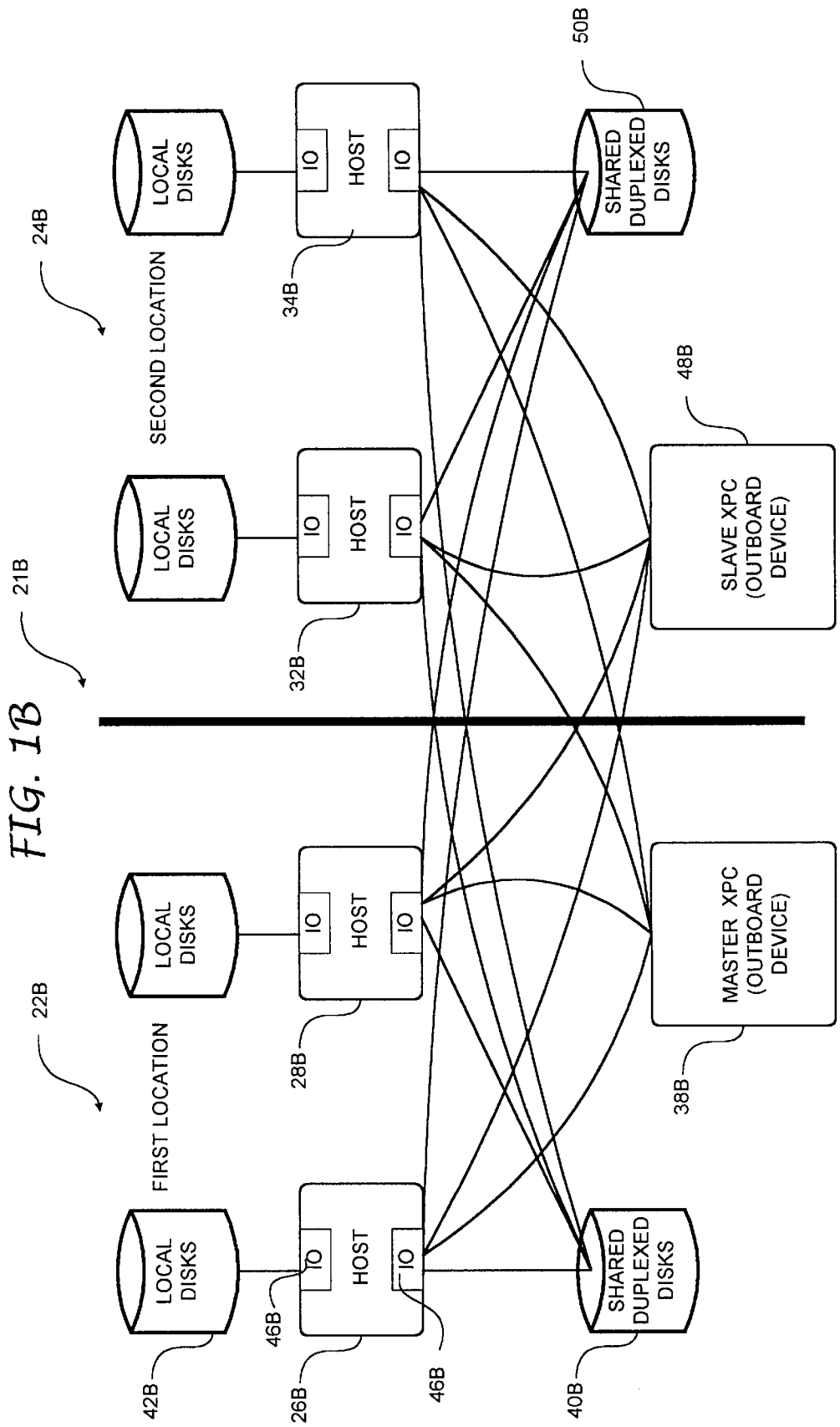
FIG. 1B is a block diagram of a data processing system building upon that of FIG. 1A, further including multiple hosts at each location.

FIG. 1B illustrates a data processing system 21B built upon the system illustrated in FIG. 1A. FIG. 1A illustrates an embodiment of the invention in a simpler system, having only a single host per site. FIG. 1B illustrates a preferred embodiment including multiple hosts per site. First site 22B includes hosts 26B and 28B, and second site 24B includes hosts 32B and 34B. Host 26B communicates with local, not-shared disks 42B and shared duplexed disks 40B and 50B through Input-Output Complexes (IOCs) 46B. Shared disks 40B are shown at first site 22B and shared disks 50B at second site 24B. The disks at 40B are preferably mirror images (duplexed) of the disks at 50B. Extended Processing Complex (XPC) 38B is illustrated communicating with hosts 26B, 28B, 32B, and 34B through IOC 46B. FIG. 1B illustrates a cluster of hosts, disks, and dual XPCs, some at first site 22B, and others at second site 24B.

Viewing site 22B alone illustrates the scalable nature of the system, having multiple disks and hosts. Site 22B also illustrates the single point of failure at XPC 38B. The terms XPC and "outboard device" are used interchangeably in this application. The term "outboard file cache" was used in a previous application incorporated by reference, where the XPC was used for file caching. XPC 38B is referred to as an outboard device as it lies beyond the input-output boundary of the host. In the preferred embodiment, XPC 38B is a dedicated device, but is a general purpose computer in another embodiment.

A second XPC 48B is illustrated in FIG. 1B, in communication with hosts 26B and 28B, removing the single point of failure of a system having XPC 38B alone. In a preferred embodiment, there is only one site, and both XPCs 38B and 48B reside at that site, providing increased system reliability over a single XPC system. In this embodiment, hosts 26B and 28B communicate with two XPCs, a first or master XPC 38B, and a second, or slave XPC 48B. The XPCs in this embodiment do not know they are masters or slaves, a software distinction known only to the hosts.

In another preferred embodiment, second XPC 48B resides at a second site 24B, and both XPCs are in communication with hosts at both sites. In one embodiment, both sites are in the same building, providing a highly reliable system. In another embodiment, the sites are geographically separated, providing improved disaster recovery, with slower communication from hosts to XPCs. Both single and multiple sites are within the scope of the invention. The slave XPC in a preferred embodiment is at a site different from that of the master XPC.

In the general application, the XPC is capable of file caching, file locking, sequence number generation, and messaging between hosts. In the preferred embodiment, the dual XPCs have file caching disabled, simplifying cache coherency problems amongst the multiple hosts. The preferred mode of operation is referred to as "Dual DSM XPC Mode", where DSM refers to Distributed System Manager, and is referred to as "Dual Mode" or "Dual XPC Mode" in the present application. XPCs also have a mechanism in the preferred embodiment for returning or initiating status messages to hosts indicating that particular files have since been written or locked by another host, making any copy of the file held in host cache likely old and in need of refreshing. "Cache Action" queries in the preferred embodiment return "valid" or "invalid" status for files that are current and possibly out of date, respectively.

In the preferred embodiment, dual XPCs are able to store files, acting as solid state disks for the so called "nailed files". Nailed files are not destaged to disk as are cached files. In one embodiment, XPCs 38B and 48B provide the sole messaging amongst hosts 26B, 28B, 32B, and 34B. In another embodiment, the hosts have an alternate communication path.

Hosts 26B, 28B, 32B and 34B coordinate shared file access through file locking procedures, and ordering of events through commit sequence numbering procedures. This prevents problems such as lost updates. File locks are requested by a host, and may be either granted immediately, rejected immediately, or queued for delayed grant when the file is unlocked by the current lock holder. A file lock request may include a command parameter indicating whether a lock request should be queued if not available or immediately rejected.

FIG. 2A illustrates a file lock request in a dual XPC system. The requesting software typically executes in host 26B in response to a request from an application such as the database manager. A lock request is received at 202, sent to the master XPC at 204, and reply awaited at 206. An immediate lock request or a delayed lock request may be requested. If an XPC goes down while holding a queued request, only a request rather than a lock may be lost. If an immediate grant is received from the master XPC at 208, a similar request is made of the slave XPC at 212, with the C_RES (Conflict Resolution) parameter set to "immediate", meaning that any grant must be either immediately granted or rejected, not queued. A lock grant is waited for at 214 and the request completed at 216. In the non-pathological case, the slave XPC must grant the lock, as the slave is queried after the master, and the slave XPC should not be holding locks that are not held by the master XPC.

If a lock grant is not received from the master XPC at 208, further processing illustrated in FIG. 2B is required. If a "wait" status is not returned from the lock request at 218, the lock request is rejected at 232. If a wait status is returned, the host waits for a delayed grant at 220. When the time specified in the lock request has elapsed at 222, if there is still no grant in the Delayed Response Message (DRM), the lock request is rejected at 230. If the lock is granted at 222, a similar lock request is sent to the slave XPC with C_RES set to immediate at 224, requesting immediate response. After waiting at 226, in non-pathological cases, a grant is received from the slave XPC and the lock returned to the requesting application at 228. As described above, the lock is not considered successful until it has been accepted by both XPCs. The only case where a slave would not immediately grant a lock request granted by a master is where the slave had not yet performed an unlock request already performed by the master.

Figure 3:
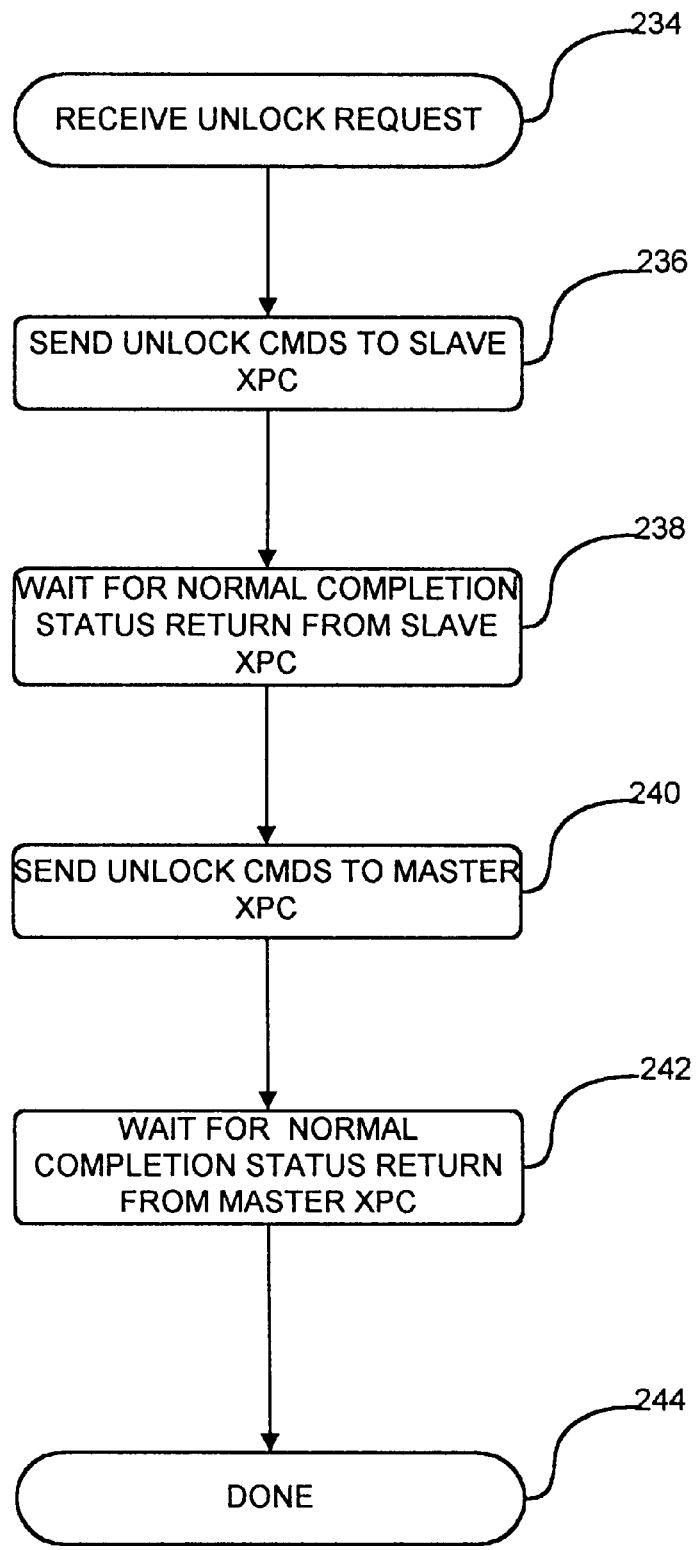
FIG. 3 is a flow chart illustrating operating system handling of a file unlock request.

FIG. 3 illustrates a file unlock request at 234, including an unlock command sent to the slave XPC at 236, a wait for response at 238 and corresponding master XPC unlock command and wait at 240 and 242. Unlocks are processed in reverse order from locks, slave first then master. This ordering aids in preventing situations where a slave XPC holds a lock that is not held by a master XPC. The distinction between master and slave XPC is not known by XPCs in the preferred embodiment, and either of the two XPCs can be master or slave. In a multi-host system, the first host to initiate dual XPC mode determines which XPC is the master and which is the slave for that system. This determination is followed by other hosts starting dual XPC mode at a later time. Thus, hosts sharing XPCs and running in dual XPC mode regard the same XPC as master. As described above, the unlock request is not considered successful until it has been accepted by both XPCs. The above method for unlocking applies to any unlock type of request.

When a host wishes to determine or write the validity of a file held in its internal cache, only the master XPC is read or written. Querying the slave XPC cache state will return an invalid state for all objects. The slave XPC's cache state would only be queried if the master XPC failed and dual XPC mode is being broken. U.S. Pat. No. 5,060,144 describes the multiple host internal cache validity method used by a precursor outboard device to the XPC.

Figure 4:
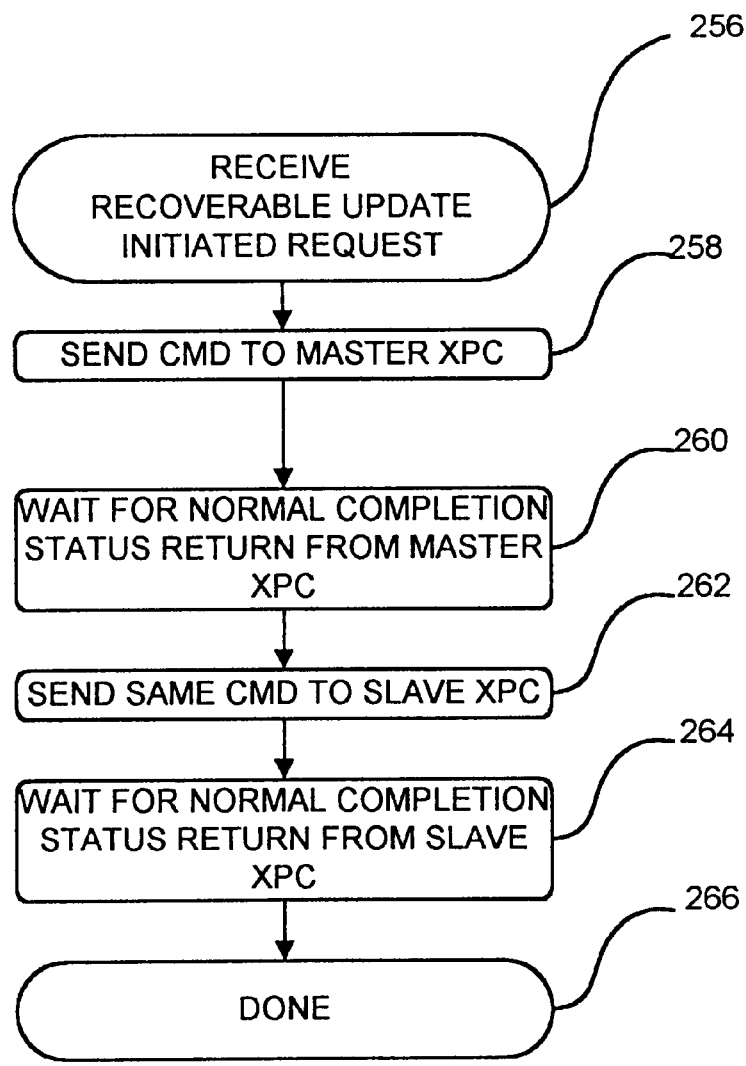
FIG. 4 is a flow chart illustrating operating system handling of a recoverable update initiated request.

FIG. 4 illustrates the dual XPC method for handling a request by an application for initiating a recoverable update or registering a deadlock timer at 256. Initiating a recoverable update involves updating an old file version with an audit trial including a series of ordered file or database transactions, to restore a file or database to a more recent state. Registering a deadlock timer involves setting a timer for a lock, indicating that action is to be taken if a lock is not granted or released within a certain time. Typical actions include performing deadlock cycle analysis and killing lock holders least expensive to restart, often the most recent process to hold locks of any type. The method of FIG. 4 is similar to the lock request method, and includes sending a command to the master XPC at 258, waiting for reply at 260, sending a similar command to the slave XPC at 262, waiting for completion at 264, and finishing at 266. The method of FIG. 4 is also used for opening and closing a message session between hosts.

FIG. 5 illustrates the dual XPC method for informing both the XPCs that a recoverable update has been completed and for reading (requesting) a, sequence number, at 270. While the scope of the invention includes sequence numbers generally, the preferred embodiment utilizes Commit Sequence Numbers (CSNs). The different order of issue to slave and master of the "recoverable update initiated" and "recoverable update completed" is to ensure that lock requests sent to the slave will never encounter any conflicts. Reading sequence numbers causes sequence number incrementing by the XPC. The ordering is similar to the ordering for unlocking a file, and includes sending a command to the slave XPC at 272, waiting for normal completion at 274, sending a similar command to the master XPC at 276, waiting for normal completion at 278, and finishing at 280.

The sequence numbers read from the slave are not passed to the application in the preferred embodiment, with the application only receiving a single sequence number. As long as all hosts running in dual XPC mode request sequence numbers from both XPCs, the order of requests as seen by the master XPC may be different than the order seen by the slave XPC. For example, the master XPC may receive sequence number requests from host 26B, application A, then host 28B, application B, then host 30B, application C. The slave XPC may receive sequence number requests from host 30B, application C, then host 26B, application A, then host 28B, application B.

As discussed below, sequence numbers in the slave XPC are greater than or equal to sequence numbers in the master XPC at any point in time. Master and slave XPC are not required to have identical sequence numbers. This allows the XPCs to run asynchronously. Allowing asynchronous running XPCs and applications in multiple hosts the freedom to obtain sequence numbers in differing order allows for increased speed, parallelism and scalability compared to requiring lock-step synchronization of XPCs, hosts and applications.

FIG. 6 illustrates a method for handling message sending requests by applications an operating system services at 326. A "send message" command is sent to one XPC at 328, waiting for completion occurs at 330, and a check for normal completion made at 332. If the command was successful, processing is complete. If not, the command is sent to the other XPC at 336, with waiting for completion at 338, and a check for normal completion at 340 with finishing at 344. A message sent to another host can be done through either XPC, and does not require both XPCs, even in dual XPC mode.

Figure 7B:
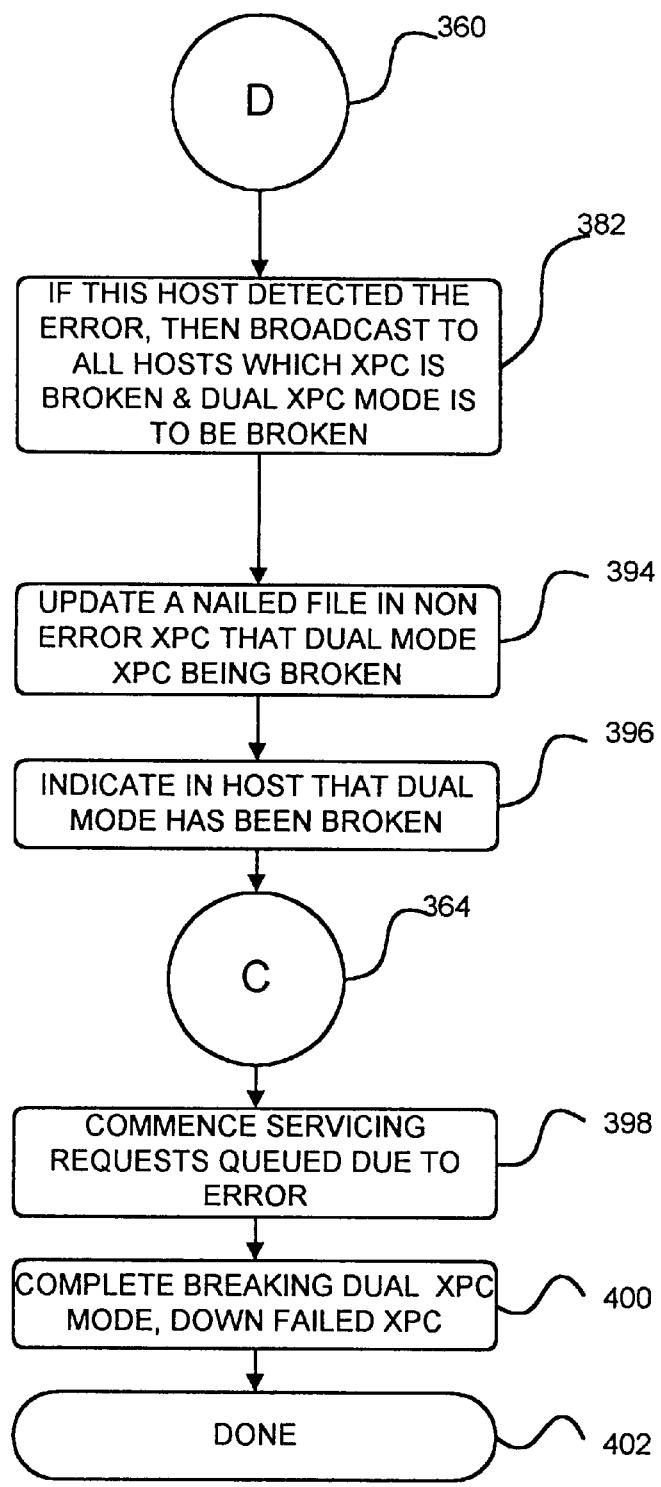

FIG. 7A illustrates the handling of an unrecoverable error in an XPC by a host in dual XPC mode at 346. Similar logic is used for switching a host from dual to single XPC mode even where there is no unrecoverable XPC error. If the error is associated with command processing itself, at 348, then the command request is queued at 362, until dual XPC mode is broken at 364 in FIG. 7B, and commands are processed in single XPC mode at 398.

If the error is not associated with command processing, if the error is associated with the master XPC and the break-master flag is set at 350, indicating the master XPC is already "broken" with respect to the host, no further processing is required, at 366, as the XPC has already been dealt with. If the error is associated with the slave XPC and the slave XPC is already broken with respect to the host at 352, no further processing is required, at 368.

If the error is associated with the master XPC and the slave XPC is already broken with respect to the host at 354, both XPCs are broken with respect to the host, and processing is stopped due to a double failure at 370. Similarly, if the error is associated with the slave XPC and the master XPC is broken with respect to the host at 356, processing is stopped at 380. If none of the above is true, then a flag is set indicating which XPC is in error and that dual XPC mode is to be broken, at 358, and processing continues at 360.

Continuing on FIG. 7B, the host broadcasts to all hosts at 382 that dual XPC mode is to be broken and indicating which XPC is broken. Each host will begin processing at 346. If the host receives a master XPC broke message and already has a break_slave status at 354 or receives a slave XPC broke message and already has a break_master status at 356, then processing halts due to a double XPC error at 370 or 380. If neither of these is true, the appropriate flag is set indicating which XPC is broken at 358 and processing continues. The processing associated with checking if both XPCs are broken is required to prevent a "network partition", where different hosts hold different views of which XPC is in error, and split into two networks, each of the two networks within the cluster communicating with a single, different XPC. Requiring this processing results in the halting of any hosts holding such differing views, as such hosts will halt on double failures at 370 or 380 in FIG. 7A.

Referring again to FIG. 7B, an indication is made at 394, preferably in the (non-erroring) XPC, that dual XPC mode is being broken, along with a timestamp, the sending host id, and the reason. Most preferably, this information is written to a nailed file in the XPC, a file that is resident in the XPC and is not swapped out. In the preferred method, this information is not attempted to be written to the erroring XPC, only the non-erroring XPC. This information is now located at a central location, accessible to hosts which were off-line at the time of the broadcast.

The host indicates internally that dual XPC mode has been broken at 396, and that commands from this point forward should be sent to only the good XPC. Command processing involving the XPC can be restarted at 398, including the processing of commands queued during the XPC error handling, which should be done quickly. Completion of breaking the dual XPC mode and downing the failed XPC, including any needed cleanup, may be done at 400, with the XPC failure handling complete at 402. If the failed XPC was a master XPC, there may be lock requests queued in the XPC. Preferably the host will re-send the waiting lock requests to the non-error XPC at 400. Less preferably, the requests are allowed to time out and must be resent, this time to the functioning XPC.

Handling a request to break the dual XPC mode is similar to, and a subset of, handling the unrecoverable XPC failure described above. The main difference is that no commands will be receiving errors and no commands will be held up for the completion of breaking of dual XPC mode.

Figure 8A:
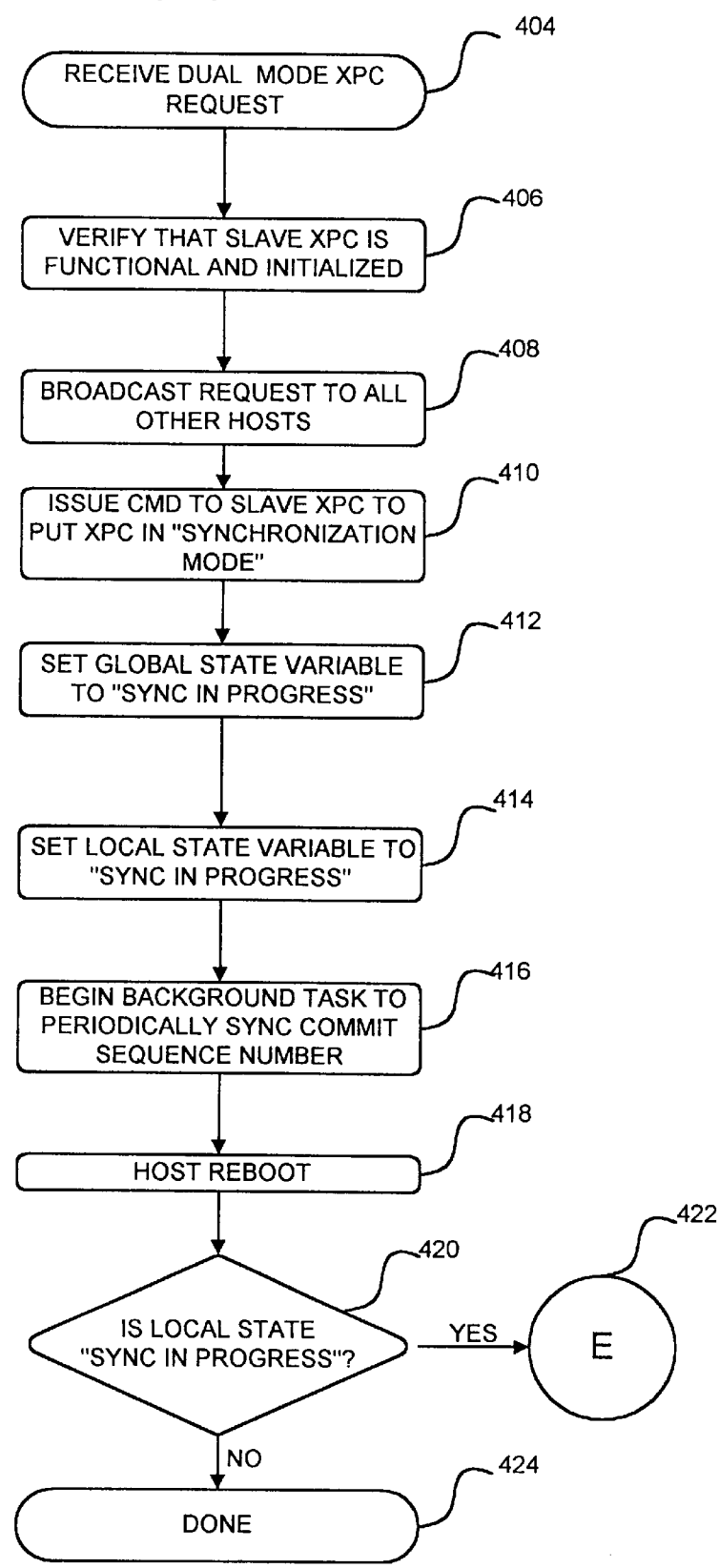

FIG. 8A illustrates the processing associated with handling a request to put a host into dual XPC mode at 404. In a high availability system, hosts are preferably converted from single XPC mode to dual XPC mode one host at a time, with normal processing required before and after such conversion. A cluster may well have some hosts in dual XPC mode, communicating with both master and slave XPCs, and other hosts in single XPC mode, communicating only with the master XPC.

It is necessary to have both global and host state variables indicating the dual XPC state of the hosts and the XPCs. The global state variable in the preferred embodiment resides in a nailed file in the XPC. This is a single state variable, updatable by each host, with the most recent to write establishing the value. The host state variable indicates the dual mode XPC state of a host, with one copy per host. In the preferred embodiment, these host state variables reside in a nailed file or files in the XPCs as well.

As part of putting a host in dual XPC mode, verification that the slave XPC is functioning properly and has been initialized is performed at 406. The hosts's request indicating that it wishes to establish dual XPC mode is broadcast to all hosts at 408. Each host receiving this broadcast message begins executing the method of FIG. 8A as well.

The host issues a command to the slave XPC to put itself in "synchronize mode" at 410. At 412, the host updates the global state variable to indicate "sync in progress". This state variable is preferably in a nailed file in the XPC. As more than one host is executing this method, this update may be done several times. At 414, the host updates the local state variable to "sync in progress".

Beginning at this point, the host will issue only read sequence number commands to both master and slave XPC, other commands will go only to the master. Sequence number commands are sent to both XPCs to assist in maintaining the slave sequence number at a value greater than or equal to that of the master. The read sequence number command causes the XPC to increment the sequence number after each read.

At 416 the host starts a background task that runs periodically and commands the slave XPC to synchronize its sequence number. In the preferred embodiment, this task runs every 2 or 3 second intervals. This task is used to keep the master and slave XPC sequence numbers reasonably close, keeping the slave XPC sequence number greater or equal to that of the master. This task is needed only during the "sync in progress" state, not during normal dual XPC mode.

In the preferred method, at 418, the host reboots. A host running in single XPC mode will have locks in the master XPC. It is undesirable to have dual XPC mode initiated with some locks existing only in the master and not the slave as the XPCs are supposed to contain the same lock information. Rebooting is used to clean locks held by the host from the master XPC. Rebooting also insures that there are no "in progress" sequence number requests being sent only to the master XPC. Any suitable method of removing locks from the master XPC and initializing it is adequate. Any locks requested by the host after reboot, in dual mode, will be issued to, and reside in, both XPCs.

After reboot at 418, processing continues. For convenience, the processing at 420 after reboot is illustrated as a continuation in FIG. 8A. The method could be alternatively illustrated in a different figure beginning with 418 as the code beginning after reboot is preferably initiated from reboot code. After reboot, if the host state variable is not "sync in progress" at 420, then no further processing is required. The "sync in progress" state is an intermediate host state occurring after the host switch to dual mode XPC has been initiated, between reboot and the "synchronized" state. If the host state is "synch in progress", then processing continues at 422 and 426 in FIG. 8B.

A background task to periodically synchronize the two XPC is started at 426. This task is designed to avoid creating a lock point at which sequence number requests must be held up for a period of time. This task is not needed after all hosts on a cluster are in dual XPC mode. The task insures that the slave XPC has a sequence number greater than or equal to that of the master XPC. The host state variable is set to "synchronized" at 428, indicating that this host is in dual XPC mode.

At 430, the host queries all hosts to determine if they are all in the "synchronized" state. This would be the case where a host was the last in a cluster to switch to dual XPC mode. In the preferred embodiment, the host state variables reside in nailed files in the XPC, and querying the host state variables requires only querying the XPC. If all hosts are not yet in "synchronized" state, no further processing is required, and the background synchronization task continues executing.

If each host is in the "synchronized" state at 430, then the host broadcasts to all hosts the fact that all hosts are synchronized at 434. Processing continues at 435, with processing by both the host doing the broadcast at 434 and hosts receiving the broadcast. Each host updates the global state variable to "synchronized", indicating all hosts on the XPC are in dual XPC mode, meaning that all hosts are sending commands to both XPCs and reading sequence numbers from both XPCs. Each host terminates the background task it was running to synchronize the two XPCs at 438. Thus, in normal dual XPC mode, there is no background synchronization task required. At 440, each host issues a command to the slave XPC, commanding it to remove itself from "synchronize" mode. Dual XPC mode is established at 442.

The present invention includes a "synchronization counter" in the XPC, which keeps track of requests to increment the sequence number. The ability to set the sequence number to a certain value is also supported.

Figure 9:
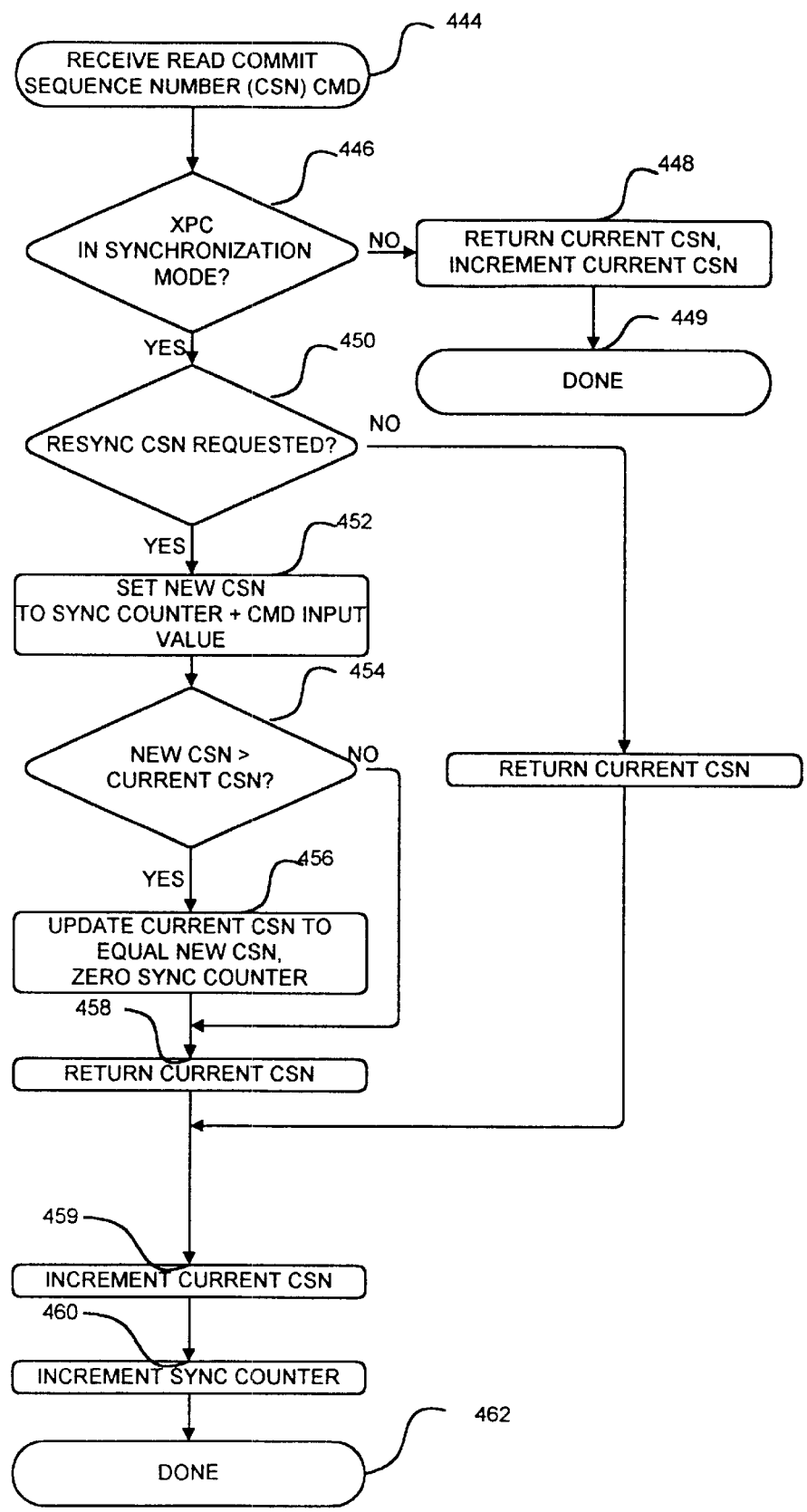
FIG. 9 is a flow chart illustrating slave XPC handling of a read sequence number or sequence number resynchronization request.

FIG. 9 illustrates the method used by the slave XPC in response to a read/synchronization request from a host. "Synchronization" for the purposes of dual XPC mode is defined to be the slave XPC having a sequence number greater than or equal to that of the master XPC. A task, such as the periodic background synchronization task, can request a sequence number read, adding parameters specifying a re-synchronization request and a number to add to the current sequence number.

It should be noted that upon reboot, each host is always issuing sequence number requests to the slave XPC first, thus the host will never perform an action on the user's behalf which could make the master have a greater number than the slave. The slave XPC's synchronization counter keeps track of how many requests have been received to increment the sequence number since the last periodic synchronization. This number is added to the received, master XPC sequence number to ensure that all user requests processed by the slave, but not yet received by the master at the time the master XPC's sequence number is read, will be accounted for.

When such a read/resynchronization request is received at 444, if the XPC is not in synchronization mode at 446, the current sequence number is returned and the sequence number is incremented at 448 as with a normal read, with processing complete at 449. If the XPC is in synchronization mode, and if a resynchronization request is included with the read at 450, then the input value, normally a recently read value from the master XPC, is added to the synchronization counter at 452 and stored as a new sequence number. The synchronization counter keeps track of requests to increment the sequence number. If the new sequence number is greater than the current sequence number at 454, the current sequence number is set to the new value and the synchronization counter is reset to zero at 456. The current sequence number is returned at 458. The current sequence number is incremented at 459 and the synchronization counter is incremented at 460. Processing is complete at 462.

Using the method of FIG. 9, the slave XPC is not required to issue the same sequence number to callers as the master XPC. Because the sequence numbers are used for relative ordering, it is only necessary that the slave XPC issue sequence numbers greater than or equal to those of master XPC. This method allows incremental adjustment of the slave XPC sequence number, without requiring a knowledge of the exact value of the master XPC sequence number value. There is no problem with slave XPC having a sequence number greater than that of the master XPC by a somewhat larger margin than necessary.

Numerous characteristics and advantages of the invention covered by this document have been set forth in the forgoing description. It will be understood, however, that this disclosure is, in many respects, only illustrative. Changes may be made in details, particularly in matters of combining, separating, and arranging steps, without exceeding the scope of this invention. It will be understood also, that the naming of states is illustrative, and applying different labels to states having identical properties is also within the scope of the invention. The invention's scope is, of course, defined in the language in which the appended claims are expressed.

What is claimed is:

1. A data processing system having a host processor for issuing file access commands, the host processor including an input-output logic section which provides an interface for input of data to the host processor and output of data from the host processor; a secondary storage device responsively coupled to the input-output logic section of the host processor for storing a plurality of files, the host processor being capable of issuing sequence number commands from the input-output logic section, including requests for sequence numbers, the host processor being capable of issuing locking commands from the input-output logic section, the locking commands including requests for file locks and unlocks; a first outboard device coupled to the host processor input-output logic section, the first outboard device being responsive to the host sequence number commands, the first outboard device being responsive to the host lock commands; wherein the improvement comprises:

a. a second outboard device coupled to the host processor input-output logic section, said second outboard device being responsive to the host sequence number commands, said second device being responsive to the host locking commands;

b. means for requesting a file lock including requesting the lock from the first outboard device, and if successful, followed by sending the file lock request to said second outboard device, the file lock request to said second outboard device including indication to not queue the lock request;

c. means for requesting a file unlock including requesting the unlock from said second outboard device followed by requesting the unlock from the first outboard device;

d. means for determining a data processing system sequence number including reading an internal sequence number from the second outboard device, followed by reading an internal sequence number from the first outboard device, wherein reading the internal sequence number increments the internal sequence number in the outboard device, wherein the system sequence number is determined by the first outboard device internal sequence number; and e. means for maintaining an internal sequence number in a second outboard device no less than an internal sequence number in a first outboard device, including initializing the data processing system to have all host processors accessing both outboard devices and to have the second outboard device internal sequence number no less than the first outboard device internal sequence number, including reading the second outboard device internal sequence number before reading the first outboard device internal sequence number.

2. A data processing system having a host processor for issuing file access commands, the host processor including an input-output logic section which provides an interface for input of data to the host processor and output of data from the host processor, the host processor being capable of issuing sequence number commands from the input-output logic section, including requests for sequence numbers; a first outboard sequence number generation device coupled to the host processor input-output logic section, the first outboard device being responsive to the host sequence number commands, wherein the improvement comprises:

a. a second outboard sequence number generation device coupled to the host processor input-output logic section, said second outboard device being responsive to the host sequence number commands;

b. means for determining a data processing system sequence number including reading an internal sequence number from the second outboard device, followed by reading an internal sequence number from the first outboard device, wherein reading the internal sequence number increments the internal sequence number in the outboard device, wherein the system sequence number is determined by the first outboard device internal sequence number; and c. means for maintaining an internal sequence number in a second outboard device no less than an internal sequence number in a first outboard device, including initializing the data processing system to have all host processors accessing both outboard devices and to have the second outboard device internal sequence number no less than the first outboard device internal sequence number, including reading the second outboard device internal sequence number before reading the first outboard device internal sequence number.

3. A data processing system having a host processor for issuing file access commands, the host processor including an input-output logic section which provides an interface for input of data to the host processor and output of data from the host processor, the host processor being capable of issuing lock commands from the input-output logic section, including requests for file locks and unlocks; a secondary storage device responsively coupled to the input-output logic section of the host processor for storing a plurality of files; a first outboard locking device coupled to the host processor input-output logic section, the first outboard device being responsive to the host lock commands, wherein the improvement comprises:

a. a second outboard locking device coupled to the host processor input-output logic section, said second outboard device being responsive to the host lock commands;

b. means for requesting a file lock including requesting the lock from the first outboard device, and if successful, followed by sending the file lock request to said second outboard device, the file lock request to said second outboard device including indication to not queue the lock request; and c. means for requesting a file unlock including requesting the unlock from said second outboard device followed by requesting the unlock from the first outboard device.

4. A data processing system comprising:

a. a host processor for issuing file access commands, said host processor including an input-output logic section which provides an interface for input of data to said host processor and output of data from said host processor;

b. a secondary storage device responsively coupled to said input-output logic section of said host processor for storing a plurality of files;

c. said host processor being capable of issuing sequence number commands from said input-output logic section, said sequence number commands including requests for sequence numbers;

d. said host processor being capable of issuing locking commands from said input-output logic section, said locking commands including requests for file locks and unlocks;

e. a first outboard device coupled to said host processor input-output logic section, said first outboard device being responsive to said host sequence number commands, said first outboard device being responsive to said host lock commands; and f. a second outboard device coupled to said host processor input-output logic section, said second outboard device being responsive to said host sequence number commands, said second device being responsive to said host locking commands.

5. In a data processing system having at least two host processors for issuing file access commands, each of the host processors including an input-output logic section which provides an interface for input of data to the host processors and output of data from the host processors; a secondary storage device responsively coupled to the input-output logic section of the host processors for storing a plurality of files, the host processors being capable of issuing sequence number commands from the input-output logic section, including requests for sequence numbers, the host processors being capable of issuing locking commands from the input-output logic section, including requests for file locks and unlocks; a first outboard device coupled to the host processor input-output logic sections, the first outboard device being responsive to the host sequence number commands, the first outboard device being responsive to the host locking commands; and a second outboard device coupled to the host processor input-output logic sections, the second outboard device being responsive to the host sequence number commands, the second device being responsive to the host locking commands, a method for one of the hosts initiating dual outboard device mode comprising the steps of:

a. receiving a dual mode request;

b. verifying that both of the outboard devices are functioning properly;

c. broadcasting a dual mode request to each of the hosts;

d. issuing a command to the second outboard device to place itself in synchronization mode;

e. updating a global state variable indicating the global state is a "sync in progress" state;

f. updating a host state variable indicating a "sync in progress" state;

g. rebooting the host;

h. if the host state is not "sync in progress", the method is finished;

i. setting the host state variable indicating a "sync in progress" state;

j. if each host state variable is not "synchronized", the method is finished;

k. broadcasting to all hosts that all hosts are synchronized; and l. updating the global state variable indicating the global state is "synchronized".

6. A method as recited in claim 5, further comprising:

a. prior to rebooting, beginning a task to periodically synchronize the sequence numbers of the outboard devices;

b. after rebooting, starting a task to periodically resynchronize the sequence numbers of the outboard devices; and c. after setting global state variable to "synchronized", terminating task that periodically resynchronizes the sequence numbers of the outboard devices and issuing a command to the second outboard device to remove itself from synchronization mode.

7. In a data processing system having at least two host processors for issuing file access commands, each of the host processors including an input-output logic section which provides an interface for input of data to the host processors and output of data from the host processors; a secondary storage device responsively coupled to the input-output logic section of the host processors for storing a plurality of files, the host processors being capable of issuing sequence number commands from the input-output logic section, including requests for sequence numbers, the host processors being capable of issuing locking commands from the input-output logic section, including requests for file locks and unlocks; a first outboard device coupled to the host processor input-output logic sections, the first outboard device being responsive to the host sequence number commands, the first outboard device being responsive to the host locking commands; and a second outboard device coupled to the host processor input-output logic sections, the second outboard device being responsive to the host sequence number commands, the second device being responsive to the host locking commands, a method for the second outboard device to return a sequence number to either host comprising the steps of:

a. receiving a read sequence number requesting including whether a resynchronization of sequence numbers is requested, and an optional sequence number input value;

b. if not in synchronization mode, returning the current sequence number and incrementing the current sequence number;

c. if the read command does not include a request to resynchronize the outboard devices, returning the current sequence number and incrementing the current sequence number and incrementing the synchronization counter;

d. calculating a new sequence number by adding the input number to the synchronization counter;

e. if the calculated sequence number is greater than the current sequence number, setting the current sequence number to the calculated value and resetting the synchronization counter to zero;

f. returning the current sequence number to the requesting host; and g. incrementing the synchronization counter.

8. In a data processing system having at least two host processors for issuing file access commands, each of the host processors including an input-output logic section which provides an interface for input of data to the host processors and output of data from the host processors; a secondary storage device responsively coupled to the input-output logic section of the host processors for storing a plurality of files, the host processors being capable of issuing sequence number commands from the input-output logic section, including requests for sequence numbers, the host processors being capable of issuing locking commands from the input-output logic section, including requests for file locks and unlocks; a first outboard device coupled to the host processor input-output logic sections, the first outboard device being responsive to the host sequence number commands, the first outboard device being responsive to the host locking commands; and a second outboard device coupled to the host processor input-output logic sections, the second outboard device being responsive to the host sequence number commands, the second device being responsive to the host locking commands, a method for the hosts to process a file unlock request comprising the steps of:

a. sending an unlock command to the second outboard device;

b. waiting for normal completion;

c. sending an unlock command to the first outboard device; and d. waiting for normal completion.

9. In a data processing system having at least two host processors for issuing file access commands, each of the host processors including an input-output logic section which provides an interface for input of data to the host processors and output of data from the host processors; a secondary storage device responsively coupled to the input-output logic section of the host processors for storing a plurality of files, the host processors being capable of issuing sequence number commands from the input-output logic section, including requests for sequence numbers, the host processors being capable of issuing locking commands from the input-output logic section, including requests for file locks and unlocks; a first outboard device coupled to the host processor input-output logic sections, the first outboard device being responsive to the host sequence number commands, the first outboard device being responsive to the host locking commands; and a second outboard device coupled to the host processor input-output logic sections, the second outboard device being responsive to the host sequence number commands, the second device being responsive to the host locking commands, a method for the hosts to process a file lock request comprising the steps of:

a. sending a lock command to the first outboard device;

b. waiting for normal completion;

c. if a lock "grant" status return is not received, rejecting the request and finishing;

d. sending a lock command to the second outboard device which indicates that the lock request is not to be queued;

e. waiting for a grant return status from second outboard device; and f. finishing.

10. In a data processing system having at least two host processors for issuing file access commands, each of the host processors including an input-output logic section which provides an interface for input of data to the host processors and output of data from the host processors; a secondary storage device responsively coupled to the input-output logic section of the host processors for storing a plurality of files, the host processors being capable of issuing sequence number commands from the input-output logic section, including requests for sequence numbers, the host processors being capable of issuing locking commands from the input-output logic section, including requests for file locks and unlocks; a first outboard device coupled to the host processor input-output logic sections, the first outboard device being responsive to the host sequence number commands, the first outboard device being responsive to the host locking commands; and a second outboard device coupled to the host processor input-output logic sections, the second outboard device being responsive to the host sequence number commands, the second device being responsive to the host lock commands, a method for the hosts to process a file lock request comprising the steps of:

a. sending a first lock command to the first outboard device;

b. waiting for normal completion of said first lock command;

c. if a lock "grant" status return is not received from said first lock command go to step g;

d. sending second a lock command to the second outboard device which indicates that the lock request is not to be queued;

e. waiting for a grant return status from the second outboard device from said second lock command;

f. going to step a;

g. if a lock "wait" status return is not received from said first lock command, rejecting the lock request and going to step a;

h. waiting for lock "grant" return status in delayed response;

i. if said "grant" return status is not received, rejecting the lock request, and going to step a;

j. sending third a lock command to the second outboard device indicating the lock command is not to be queued;

k. waiting for a lock "grant" return status from the second outboard device from said third lock command; and l. ending the file lock request processing.

11. In a data processing system having at least two host processors for issuing file access commands, each of the host processors including an input-output logic section which provides an interface for input of data to the host processors and output of data from the host processors; a secondary storage device responsively coupled to the input-output logic section of the host processors for storing a plurality of files, the host processors being capable of issuing sequence number commands from the input-output logic section, including requests for sequence numbers, the host processors being capable of issuing lock commands from the input-output logic section, including requests for file locks and unlocks; a first outboard device coupled to the host processor input-output logic sections, the first outboard device being responsive to the host sequence number commands, the first outboard device being responsive to the host lock commands; and a second outboard device coupled to the host processor input-output logic sections, the second outboard device being responsive to the host sequence number commands, the second device being responsive to the host lock commands, a method for one of the hosts to process an unrecoverable error in an outboard device comprising the steps of:

a. if the error is associated with command processing, queuing the command request and going to step g;

b. if the error is with either of the outboard devices and the broken outboard device status is already known, no more processing is required;

c. if the error is with either of the outboard devices and the other outboard device status is already known as broken, stopping the host;

d. indicating which outboard device is in error;

e. broadcasting to all hosts that dual mode is to be broken;

f. updating a status variable in the non-error outboard device indicating that dual mode is being broken; and g. servicing any command requests.

* * * * *

UNITED STATES PATENT AND TRADEMARK OFFICE
CERTIFICATE OF CORRECTION

PATENT NO.    : 5,940,826
DATED         : August 17, 1999
INVENTOR(S)   : Heideman et al.

It is certified that error appears in the above-identified patent and that said Letters Patent is hereby corrected as shown below:

Column 16,
Line 59, insert -- a -- after "sending", and delete "a" after "second".

Column 17,
Line 5, insert -- a -- after "sending", and delete "a" after "third".

Signed and Sealed this

Twenty-fourth Day of September, 2002

*Attest:*

*Attesting Officer*

JAMES E. ROGAN
*Director of the United States Patent and Trademark Office*